United States Patent [19]

Byers

[11] 4,336,137

[45] Jun. 22, 1982

[54] SCAVENGING APPARATUS

[76] Inventor: Edward V. Byers, 17 Cavendish Crescent North, The Park, Nottingham, England

[21] Appl. No.: 189,954

[22] PCT Filed: May 25, 1979

[86] PCT No.: PCT/GB79/00085
§ 371 Date: Jan. 26, 1980
§ 102(e) Date: Jan. 24, 1980

[87] PCT Pub. No.: WO79/01135
PCT Pub. Date: Dec. 27, 1979

[30] Foreign Application Priority Data

May 26, 1978 [GB] United Kingdom ............... 23672/78
Feb. 21, 1979 [GB] United Kingdom ................ 7906163

[51] Int. Cl.³ .............................................. E02B 15/04
[52] U.S. Cl. .................................. 210/242.3; 210/923
[58] Field of Search ...................... 210/923, 242.3, 776

[56] References Cited

U.S. PATENT DOCUMENTS

| 3,338,414 | 8/1967 | Lefke et al. | 210/923 |
| 3,358,838 | 12/1967 | Koser et al. | 210/923 |
| 3,617,555 | 11/1971 | Ginsburgh | 210/242.4 |
| 3,623,609 | 11/1971 | Ainley | 210/923 |
| 3,656,624 | 4/1972 | Walton | 210/923 |
| 3,732,161 | 5/1973 | Grutsch et al. | 210/923 |
| 3,968,041 | 7/1976 | De Voss | 210/923 |
| 4,032,449 | 6/1977 | De Visser | 210/923 |
| 4,172,036 | 10/1979 | Morris | 210/242.4 |

FOREIGN PATENT DOCUMENTS

2229260 11/1974 France ................................ 210/923

Primary Examiner—Benoit Castel
Attorney, Agent, or Firm—Sughrue, Mion, Zinn, Macpeak and Seas

[57] ABSTRACT

Scavenging apparatus is disclosed in which a toothed structure has its teeth moved in a prescribed closed path to engage material being scavenged. The apparatus has particular application to removing oil from slicks at the surface of the sea in which case the teeth at least have oleophilic surfaces. In one form a plurality of spaced toothed discs are rotated partially immersed in the sea, and oil accreted to the toothed discs is removed by a scraper device for discharge in a vessel which may be the vessel carrying the discs. Another structure is an endless chain of teeth, which may also be used as a lifting pump, and a preferred structure is an endless belt or conveyor carrying lateral rows of teeth longitudinally aligned that is immersed in the sea at one lower end and has the oil removed therefrom at the other end by a scraper arrangement. A set of rotatably mounted toothed discs, resiliently mounted with respect to the conveyor, are located adjacent the lower end to assist in breaking up viscid or weathered oil with the disc teeth longitudinally interleaved with the conveyor teeth. The set of toothed discs may be substituted by a plain roller, or a plain or corrugated conveyor may be employed with the toothed discs. The toothed conveyor and disc structure may be used for other scavenging, such as clearing seaweed, in which case the teeth need not be oleophilic.

14 Claims, 8 Drawing Figures

SCAVENGING APPARATUS

TECHNICAL FIELD

This invention relates to an apparatus for displacing oil or other oleaginous substances, particularly where such oil is found admixed with a particulate material or is found at the surface of water or aqueous solutions. An example of the last-mentioned circumstance is the scavenging of large oil patches, which are commonly known as oil slicks, from the surface of the sea.

The invention also relates to the scavenging of other materials, particularly from waterways.

The invention further relates more generally to the removal or extraction of oil from a pool or reservoir of same.

BACKGROUND ART

Much attention has been given in recent times to the reduction of pollution from oil spillage at sea. Various methods have been proposed to deal with the serious pollution problems that arise when large quantities of oil are lost from tankers or other vessels. The oil tends to float in large slicks at or adjacent the suface of the sea.

One method of removing these oil slicks is by chemical dispersion, using chemicals to break up the oil. Such techniques are well known. They are expensive to perform and are often unsatisfactory with heavy, viscid oil which tends to become even more viscid under the weathering action at sea.

Other methods are primarily mechanical, for example, collecting the oil with the aid of booms which is not practical for very large slicks or passing an endless rope of olephilic material through the slick, the oil gathered thereby being removed for disposal. Such methods so far proposed have not proved as satisfactory as we hoped and in particular it is heavy viscid oils that are most difficult to handle satisfactorily.

DISCLOSURE OF THE INVENTION

In a first aspect the invention provides an apparatus for removing oil from a patch of oil at or adjacent the surface of a watery medium comprising moving means around a prescribed path a portion of which is immersed in the surface zone of the watery medium to accrete oil to said means and removing the oil from said means at another portion of said path characterised in that the means comprises a set of teeth having oleophilic surfaces.

In a second aspect the invention provides an apparatus for extracting oil from a pool or reservoir of oil characterised in that an endless chain of teeth having oleophilic surfaces is moved about a prescribed path extending generally vertically and the lower portion of which extends into the pool or reservoir, and the oil accreted to the teeth is removed from the chain at a higher level.

In a third aspect the invention provides apparatus for removing oil from a patch of oil at or adjacent the surface of a watery medium comprising a vessel; a structure carried by the vessel, and a set of teeth having oleophilic surfaces carried by the structure for movement about a prescribed path a portion of which is immersed in said watery medium for accretion of oil to said teeth; and means located at another portion of said path to remove oil accreted to said teeth therefrom.

In a fourth aspect the invention provides apparatus for removing oil from a patch of oil at or adjacent the surface of a watery medium, an endless conveyor arrangement having a portion thereof immersed in the watery medium and having an oleophilic surface; and rotatable means having an oleophilic surface mounted adjacent said conveyor arrangement at a location where it emerges from the watery medium, and the oleophilic surface of at least one of the endless conveyor and the rotatable means being constituted by a set of projecting teeth.

In a fifth aspect the invention provides scavenging apparatus comprising an endless conveyor arrangement carrying teeth projecting outwardly of the conveyor, the conveyor path moving between upper and lower levels, and a toothed, rotatable means supported adjacent an end portion of the conveyor at the lower level where the conveyor arrangement rises upwardly, the teeth of said rotatable means being interleaved with those of the conveyor arrangement to coact therewith on material gathered up by the lower end portion of the conveyor arrangement.

DESCRIPTION OF THE EMBODIMENTS

Figure 1:
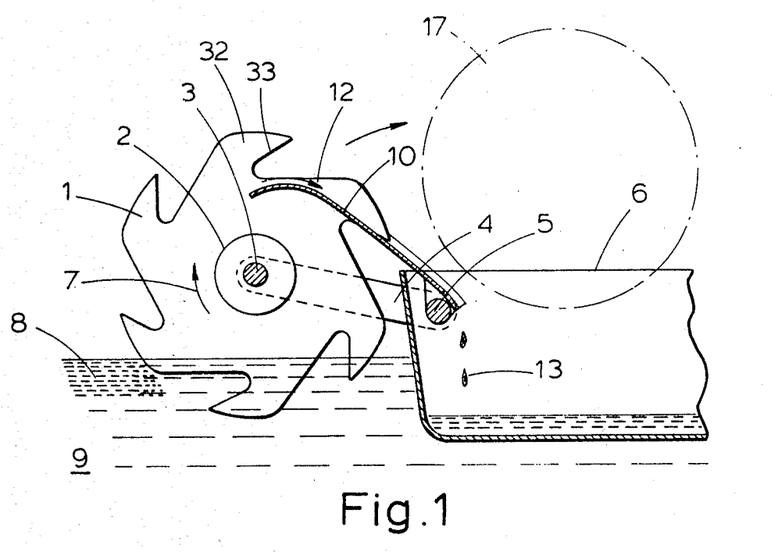
FIG. 1 shows a simplified side elevation of one embodiment of the invention using toothed discs.
Figure 2:
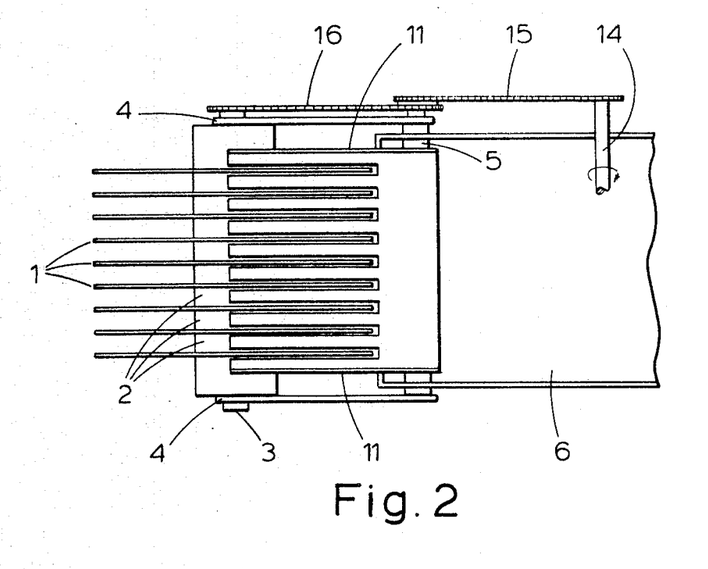
FIG. 2 shows a plan view of the apparatus of FIG. 1.

The apparatus seen in FIGS. 1 and 2 comprises a number of parallel toothed discs 1 spaced apart by cylindrical spacers 2 and each centrally secured firmly to a shaft 3 which is rotatably mounted in bearings at the ends of substantial levers 4 which are securely fixed to a rigid shaft 5, the latter being pivotally mounted in the recovery receptacle 6, only a part of which is shown. The discs, or at least the toothed peripheral portions, have oleophilic surfaces as is discussed further hereinafter. The receptacle 6 may be a buoyant vessel of quite small size from which any oil recovered is pumped into a larger vessel by which the apparatus is pushed or towed. It may also be a large vessel equipped with its own propulsion unit or a barge which is normally used for the transportation of oil which has been furnished with emplacements so that the scavanging apparatus can be fitted rapidly in case of urgent necessity. The shaft 3 is caused to rotate in the direction of the arrow 7 so that toothed peripheral portions of the discs are forced to pass through the oil slick 8 floating on the sea 9 thus becoming coated with oil, most of which remains adhering to the discs until they pass through the closely fitting scraper comb 10 which is of curvaceous form and also secured to the shaft 5 where it terminates as an inclined plate. The outermost blades of the comb are provided with upwardly turned flanges 11 to provide channels through which the oil stripped from the outermost discs may flow. Owing to the hydrodynamic action which takes place as a result of the stripping action of the curved comb blades the stripped oil is forced to move in the direction of the arrow 12 until it reaches the inclined portion of the comb from which it falls into the recovery receptacle as shown at 13. Very stiff sludge accumulated in the vessel 6 may be difficult to pump away subsequently. This problem can be eased by mixing the incoming oil from comb 10 with a diluent. To this end the oil is discharged between a pair of rolls (not shown) mounted adjacent the lower end of the comb and rotating oppositely to draw the oil away from the comb and at different peripheral speeds to provide a shearing and mixing action on the oil to which the diluent is added from a manifold (not shown). Used auto engine oil is a suitable diluent. The curvature of the comb surface over which the oil flows, i.e. the surface as seen in FIG. 1, is defined by a spiral of increasing radius in the clockwise direction. Consequently the comb surface is nowhere locally tangential to a radius of a disc 1 and is, therefore, always performing a scraping action with respect to the disc. It will also be apparent that in practice it is mainly the outer, toothed, peripheral portions of the discs which are operative in the scavenging of oil.

FIG. 1 shows each disc 3 to have its periphery formed with a series of hook portions 32. These portions are formed, for example, by indenting the peripheral edge of a circular disc. The points 33 of the hooks project forwardly in the direction of rotation of the disc 1 and as seen in the illustrated operative position of the apparatus each disc 1 is submerged to the extent that the rotating hooks rise toward the under surface of a partly submerged oil slick 8 providing in conjunction with the forward movement of the vessel an upward force on the oil driving it toward the surface and, of course, acting to penetrate the oil for accretion onto the oleophilic disc surface. It will be noted that the active portion of each disc 1 is essentially the outer hooked peripheral portion and the comb 10 is designed and located at this outer peripheral portion extending initially along a spiral curve so as to ensure a scraping action over the peripheral portion.

The apparatus may be rotated by any convenient source or rotary power 14 carrying a sprocket which drives a chain 15 causing rotation of a double idler sprocket mounted on shaft 5 which in turn causes rotary motion of the shaft 3 by means of a sprocket mounted on its end engaging with the chain 16. The disc system may thus be rotated regardless of its position relative to the receptacle 6. When not in use the disc system may be lifted out of engagement to the position shown by the dotted lines 17 by means of a derrick mounted in the recovery vessel acting on slings attached to the outboard ends of the levers 4 or by means of a hydraulic actuator acting directly on shaft 5; such means may also be used to adjust the height of the disc system relative to the carrying vessel as the latter settles owing to the weight of charge taken on board. It is desirable to provide the driving mechanism with means of speed adjustment especially when operating on thin oil slicks as some water is then carried upward on the discs and it is then necessary to slow down the speed of rotation to allow the relatively mobile water to drain off before the stripping comb is reached. Disc sizes of from one to five meters diameter are envisaged running at peripheral speeds of one half to three meters per second. The scraper combs will usually be made of metal and may be provided with wiping strips made of neoprene or other oil-resistant elastomer for use with thin mobile oils but this is not presently thought to be necessary for dealing with heavy crude oils.

Oleophilic surfaces are readily obtainable because any dry substance which is insoluble in water becomes strongly repellant to the latter once it has been wetted with oil. Polyethylene and polypropylene are excellent materials owing to their natural hydrophobic nature and can be used in the solid form or as coatings on metal substances. However, in designs for which the use of a rigid material is indicated, dry and slightly rusted steel which has been wetted with oil is quite satisfactory.

When oil is freshly discharged at sea it usually contains a proportion of volatile constituents which tend to evaporate owing to exposure to the air and the stirring action resulting from the motion of the sea. The effect continues until the density of the oil causes it to sink lower and lower until it is only just floating with resulting reduction in area exposed to the evaporative influence of the atmosphere. It also becomes much more viscous and resistant to penetration. Certain types become so viscid that they could more properly be regarded as gels rather than liquids. The toothed discs act to penetrate and accrete such viscid material in the manner described above.

The discs might be used for collecting oil or tar-bearing sands or other similar particulate material by mounting the disc assembly to an appropriate vehicle incorporating a receptacle for the oil or tar-bearing vehicle.

In some circumstances an apparatus comprising a single toothed disc might be of value, for example in scavenging in a narrow inlet or waterway.

Figure 3:
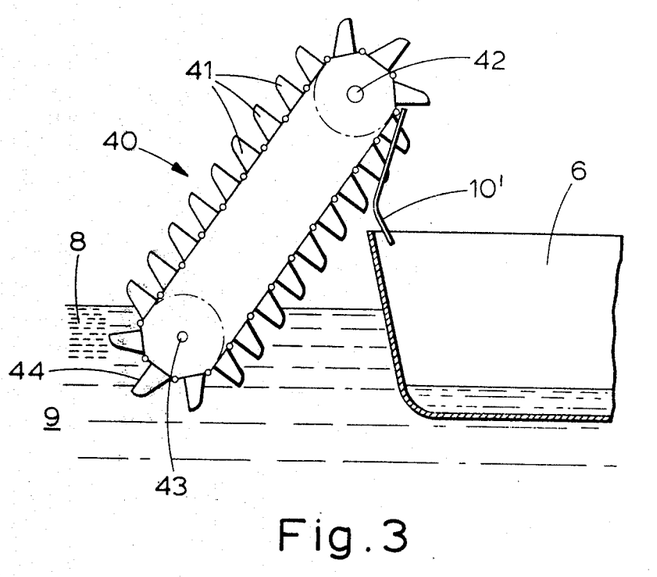
FIG. 3 shows in a simplified side elevation an apparatus of the invention employing an endless toothed belt or chain of teeth.

Another embodiment that is also narrow is shown in FIG. 3.

FIG. 3 shows an embodiment of the invention in which an endless chain 40 of pivotally linked blades or teeth 41 is provided. The chain is supported by sprockets, rollers or any other suitable means rotatably mounted on axles 42, 43. The remaining support structure securing the chain 40 to the vessel 6 is omitted but may take the form of lever arms such as described in connection with FIGS. 1 and 2. The blades thus lie in the plane of movement of the chain 40 and each has a forward edge 44 which rises or scoops into the oil slick 8 providing an upward thrust on it. The projection of the blades 41 in the plane of movement is such as to inherently promote the required action on it. A comb 10' is provided having a tooth on each side of the blades and is shaped to provide a scraping action thereover for discharge into the vessel 6. This endless chain arrangement is narrower than the set of spaced discs of the apparatus of FIGS. 1-2, and as indicated above may find use in scavenging in narrow inlets or waterways. Alternatively it can be used for extracting oil or tar-bearing sand or the like when fitted to a suitable vehicle.

In the apparatus described, the comb (10, 10') may be mounted for vibration in order to assist stripping of the accreted oil.

THE PREFERRED EMBODIMENT

For heavier oils, particularly those which have become highly viscid and lumpy, due to weathering or other treatment, another embodiment of the invention may be used. This is the embodiment shown in FIGS. 4 to 6.

Figure 4:
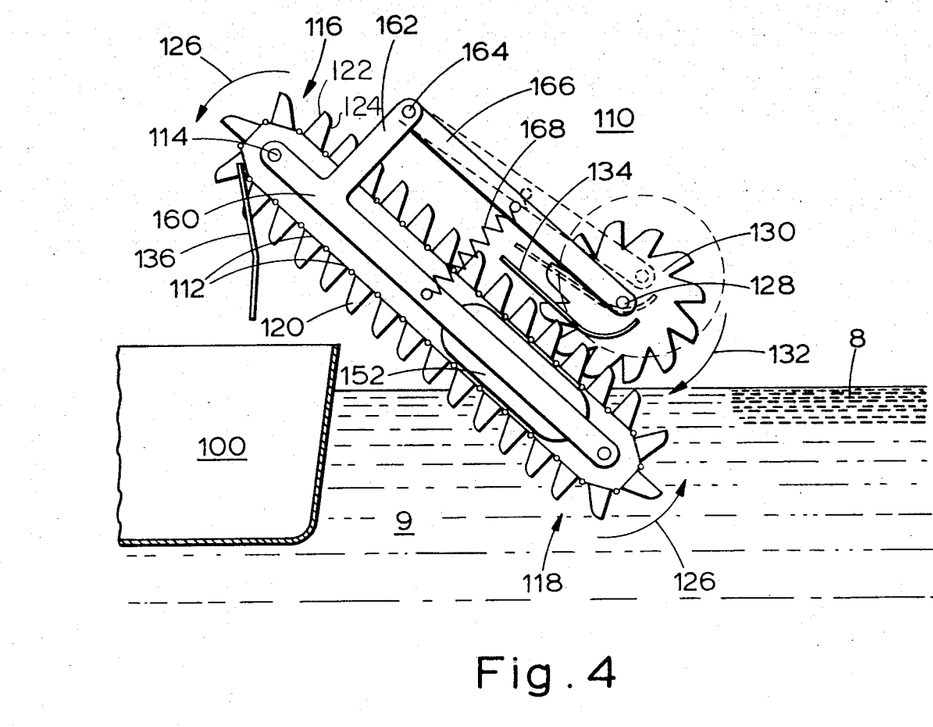
FIG. 4 shows in a simplified side elevation a preferred embodiment of the invention employing a toothed conveyor cooperating with a toothed disc.

FIG. 4 shows a conveyor arrangement 110 carried by and projecting forwardly from the bow of a vessel 100. The conveyor arrangement 110 dips into the sea 9 and is being advanced into an oil slick 8 floating at the surface. The support framework for the conveyor arrangement is not shown in FIG. 4.

Figure 5:
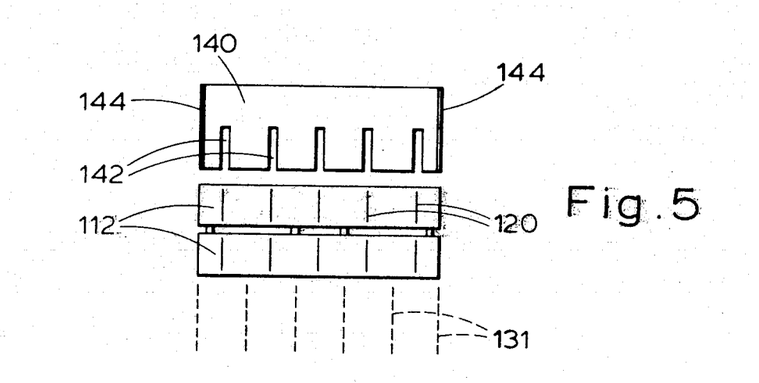
FIG. 5 is a fragmentary plan view of a portion of the conveyor and of the form of a scraper comb structure usable therewith.

The conveyor arrangement comprises an endless belt made up of pivotally-linked slats 112 which are driven around end axles 114 by sprocket wheels (now shown). One end 116 of the conveyor is supported above the bow section of the vessel, the conveyor extending forwardly and downwardly with its lower end 118 in the sea. Each slat 112 carries a row of teeth 120 (better seen in FIG. 5) each having an upright forward edge 122 in the direction of motion and a sloping trailing edge 124. The direction of motion is indicated by arrows 126 and the lower end 118 is positioned so that the teeth rise into the oil and carry the accreted oil along the upper side of the conveyor for discharge into the vessel. FIG. 5 shows two of the slats 112, each slat bearing the same number of teeth 120 with the teeth equipositioned on each slat so as to form longitudinal rows along the conveyor.

Mounted above the lower end of the conveyor is an axle 128 carrying a plurality of parallel, peripherally-toothed discs 130. The toothed discs are interleaved with the longitudinal rows of conveyor teeth, i.e. lie in planes indicated by the dashed lines 131 in FIG. 5 relative to the conveyor slats shown in that figure. The conveyor and disc teeth interleave substantially at the surface of the sea so as to engage and draw in heavy, sticky patches of oil. To this end the discs 130 are rotated as indicated by arrow 132 to move with the conveyor teeth at the arc of interleaving. Oil clinging on the toothed discs is removed by a close fitting comb device 134, which strips the oil as the teeth enter the interleaving zone and which is extended parallel to the conveyor to assist in guiding this oil onto the upward portion of the conveyor. Both the conveyor and toothed discs are conveniently driven from means within the recovery vessel using chain and sprocket drives.

To meet the problem of a piece of flotsam being gathered from the water by the toothed conveyor, the toothed discs are mounted on spring-loaded arms so that the discs can swing away from the conveyor belt when high resistance due to a piece of flotsam is encountered.

Referring again to FIG. 4, the conveyor arrangement includes longitudinal struts 160 (one of which is seen) between which the axles 114 are supported. These struts carry extensions 162 to which is pivotally mounted at 164 ends of respective arms 166 whose opposite ends support between them the axle 128 of the toothed discs. The arms 166 are biased to urge the discs 130 towards the conveyor by springs 168 shown diagrammatically as tension springs acting between the arms 166 and the struts 160.

FIG. 4 illustrates the normal operating position of the toothed disc assembly in full line, the dashed line indicating how it can swing away from the conveyor when necessary.

At the upper end of the conveyor the oil is stripped from the teeth, as they begin their downward descent, by another comb device 136, and is discharged into the vessel. FIG. 5 illustrates a comb structure 140 in general form having openings 142 which provide a narrow clearance for the teeth to be stripped by the comb. Structure 140 is of general form: the specific comb devices 134 and 136 are shaped for the function and guidance required. The structure may be provided with flanges at the side edges 144 to contain the oil in the wanted guidance path as mentioned in connection with FIG. 2. It will be seen that as applied to the comb device 136, the structure will enable the removal of excess oil collected between the teeth of the conveyor slats as well as stripping oil from the teeth.

Figure 6:
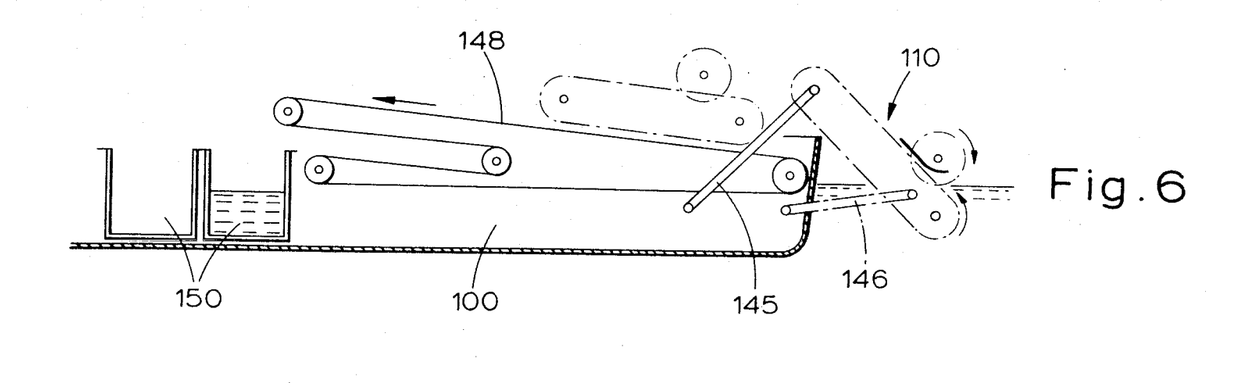
FIG. 6 is a diagrammatic side view, partly in section, showing the general arrangements for mounting the apparatus of FIG. 4 on a vessel and for storing the scavenged oil.

The mounting of the conveyor arrangement 110 to the vessel is indicated in FIG. 6 where it is mounted by means of hydraulic ram-type lever arms 145, 146 whereby the whole assembly can be swung from the operative position to an inboard stowed position. The oil removed from the toothed conveyor belt is discharged onto an extendable conveyor belt 148 that is positioned to convey the oil to a selected one of a group of storage tanks 150 carried amidships. To assist in maintaining the correct positioning of the lower end of the conveyor arrangement relative to the moving surface of the sea, the interior of the conveyor arrangement is provided with a sealed buoyancy chamber 152 at the lower end portion (FIG. 4).

It is contemplated that the conveyor arrangement could be made as wide as or wider than the recovery vessel. In this case it would be necessary to shape the comb device 136 and any passageways leading from it to discharge oil onto the narrower conveyor belt 148.

The surfaces of the teeth of conveyor arrangement 110 and the discs are oleophilic. The conveyor teeth are relatively thin though of substantial depth in the direction of motion to provide a good surface area for the adhesion of oil. A tooth height of 8 cms. has been found suitable with the lateral and longitudinal spacings between adjacent teeth of about 5 cms. The conveyor slats can have their outer surfaces to which the teeth are mounted also of oleophilic material, e.g. slightly rusted steel as suggested above, to promote the oil lifting power of the conveyor belt. It is contemplated that the apparatus employing the toothed conveyor belt of FIGS. 4 to 7 is particularly suited to scavenging heavier oils of SAE 200 upwards to heavily weathered oil.

In the apparatus of FIGS. 4 to 6, the conveyor and disc teeth interleave at or a little above the sea surface. The teeth react together to penetrate the oil and with the aid of the comb 136 deposit it onto the upwardly rising conveyor. The conveyor is preferably driven at a speed in excess of the peripheral speed of the disc teeth to aid in removing the gathered oil from the interleaving area.

Figure 7:
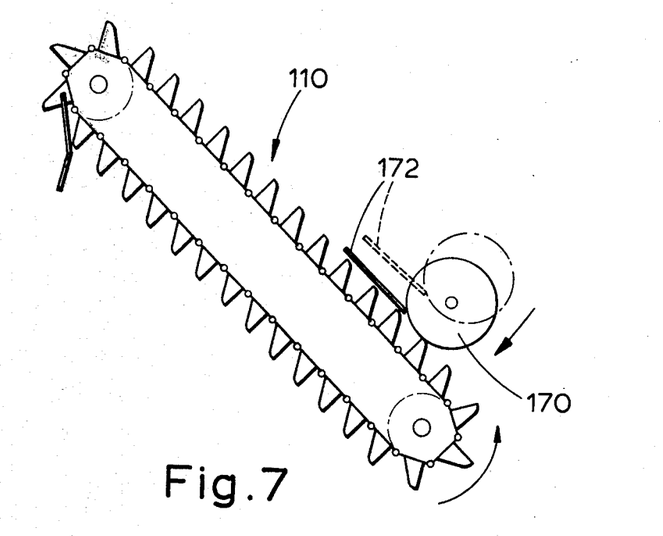
FIGS. 7 and 8 show in side elevation modifications of the apparatus of FIG. 4.
Figure 8:
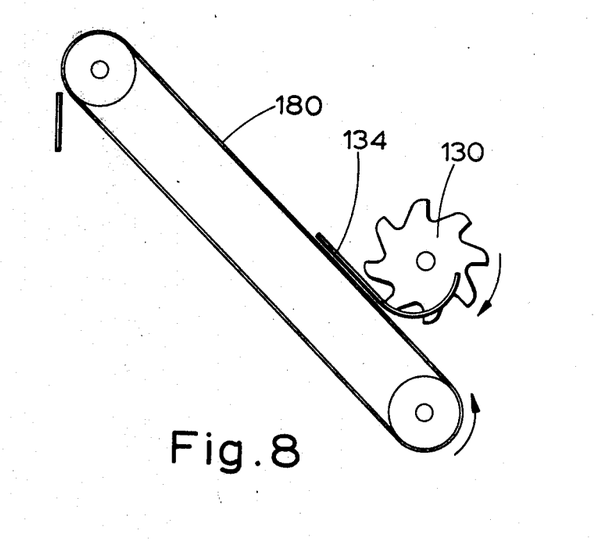

While the above described embodiment is preferred, simpler versions may also be employed and these are illustrated in FIGS. 7 and 8 where only the points of distinction are illustrated.

FIG. 7 shows the conveyor arrangement 110 in which the toothed discs are replaced by a plain roller 170 or by a set of plain discs. The latter have the advantage of interleaving with the conveyor teeth to react with these teeth and cause the oil to adhere thereto. The plain roller is provided with a cooperating doctor blade 172 to strip oil from the roller and deposit it on the conveyor. The plain discs would have the comb 134. The roller, like the toothed discs, is preferably spring biased to be movable away from the conveyor as indicated by the dashed line. The roller assists in ensuring that the oil is fixed on to the conveyor for upward delivery.

FIG. 8 shows the use of a smooth conveyor 180 cooperating with toothed discs 130 of the kind described with reference to FIG. 4. The conveyor surface is oleophilic and the oil accreted or tending to accrete thereto is penetrated by the disc teeth to affix to the conveyor with the aid of comb 134 for upward delivery. Rather than an entirely smooth belt, it may be corrugated to increase adhesion.

INDUSTRIAL APPLICABILITY

The embodiments of the invention described above are all concerned with the scavenging of oil, and particularly heavy, viscid oil, from the sea or estuary waters. Although the embodiment of FIGS. 4 to 6 is preferred for this purpose, the other embodiments might be found more suitable in particular circumstances. As already mentioned, the chain of teeth of the embodiment of FIG. 3 is particularly useful for narrow confines.

The embodiment of FIG. 3 may also be arranged to act as a lifting pump for lifting oil from a pool of oil. In this case the chain is arranged vertically with its lower end dipping into the pool and with the scraper comb acting at the upper end to remove the oil raised from the pool.

Referring again to FIG. 4, mention has already been made of the possibility of picking up flotsam, which in the case of oil scavenging can be a hazard. However, the apparatus of FIG. 4 can be used for more general scavenging and in particular has application to the clearing of weed, for example, seaweed from fouled waterways. The toothed structures are particularly effective at gathering and shredding the weed for subsequent disposal. It will of course be appreciated that in this case, oleophilic surfaces are not required.

I claim:

1. Scavenging apparatus for removing material from a surface zone of a body of water, comprising:
    a support vessel;
    an elongate conveyor system extending from a location outside the vessel to a location inboard of the vessel, said conveyor system having an outer end portion disposed below the surface zone and an upwardly rising portion extending therefrom to rise through the surface zone and upwardly toward the inboard location, said conveyor system being movable to deliver material collected at the surface zone;
    said conveyor system including an endless belt having stiff teeth projecting therefrom;
    rotatable means mounted adjacent said conveyor system at a location where the conveyor belt emerges from said surface zone;
    said rotatable means being supported to rotate about an axis extending laterally of and spaced from the conveyor belt at a position at which said rotatable means engages material after it has been lifted by the conveyor system and forms a coaction zone with the conveyor belt teeth to cause adhesion of the material thereto for conveyance of the material inboard of the vessel;
    scraper means cooperating with said conveyor system to aid in removing adhering material therefrom for discharge inboard of said vessel;
    a support structure for said rotatable means, said rotatable means having an axle which is carried by said support structure and about the axis of which said rotatable means rotates, and said support structure including means allowing displacement of said axle toward and away from said conveyor system; and
    said conveyor belt comprising a plurality of pivotally linked transverse slats, each slat having an oleophilic outer surface from which projects a lateral row of spaced plate-like members, said scraper means comprising a comb structure interleaved with longitudinal rows of conveyor teeth to scrape material from the side surfaces of said plate-like members and the surfaces of said slats between the members.

2. A scavenging apparatus as claimed in claim 1 in which:
    said conveyor teeth are arranged in rows extending longitudinally in the direction of conveyor movement; and
    said rotatable means comprises laterally spaced rows of teeth laterally offset with respect to the rows of teeth of said conveyor system and interleaving therewith at said coaction zone.

3. Scavenging apparatus for removing material from a surface zone of a body of water, comprising:
    a support vessel;
    an elongate conveyor system extending from a location outside the vessel to a location inboard of the vessel, said conveyor system having an outer end portion disposed below the surface zone and an upwardly rising portion extending therefrom to rise through the surface zone and upwardly toward the inboard location, said conveyor system being movable to deliver material collected at the surface zone;
    said conveyor system including an endless belt having stiff teeth projecting therefrom;
    rotatable means mounted adjacent said conveyor system at a location where the conveyor belt emerges from said surface zone;
    said rotatable means being supported to rotate about an axis extending laterally of and spaced from the conveyor belt at a position at which said rotatable means engages material after it has been lifted by the conveyor system and forms a coaction zone with the conveyor belt teeth to cause adhesion of the material thereto for conveyance of the material inboard of the vessel; and
    scraper means cooperating with said conveyor system to aid in removing adhering material therefrom for discharge inboard of said vessel,
    said conveyor teeth being arranged in rows extending longitudinally in the direction of conveyor movement;
    said rotatable means comprising laterally spaced rows of teeth laterally offset with respect to the rows of teeth of said conveyor system and interleaving therewith at said coaction zone; and
    said teeth comprising plate-like planar members having oleophilic surfaces, each of whose planes is parallel to the direction of conveyor movement.

4. A scavenging apparatus as claimed in claim 3 or 1, comprising scraper means disposed to remove adhering material from said rotatable means and deposit the removed material downstream of said coaction zone in the direction of conveyor movement.

5. A scavenging apparatus as claimed in claim 3 comprising a scraper comb cooperating with the rows of teeth of said rotatable means to remove material adhering thereto and deposit it onto said conveyor belt downstream of said coaction zone in the direction of conveyor movement.

6. A scavenging apparatus as claimed in claim 3 in which said conveyor belt comprises a plurality of pivotally linked transverse slats, each slat having a lateral row of teeth secured thereto.

7. A scavenging apparatus as claimed in claim 3 including a support structure for said rotatable means, said rotatable means having an axle which is carried by said support structure and about the axis of which said rotatable means rotates, and said support structure including means allowing displacement of said axle toward and away from said conveyor system.

8. A scavenging apparatus as claimed in claim 7 in which said support structure further includes resilient means biasing said axle toward said conveyor system.

9. Scavenging apparatus as claimed in claim 7 in which:
said conveyor belt comprises a plurality of pivotally linked transverse slats, each slat having an oleophilic outer surface from which projects a lateral row of spaced plate-like members, said scraper means comprising a comb structure interleaved with longitudinal rows of conveyor teeth to scrape material from the side surfaces of said plate-like members and the surfaces of said slats between the members.

10. Scavenging apparatus for removing oil from a surface zone of a body of water comprising:
a support vessel;
an elongate conveyor system extending from a location outside the vessel to a location inboard of the vessel, said conveyor system descending from a location inboard of the vessel to a location outside the vessel and below the surface zone, and said conveyor system including an endless belt carrying an oleophilic surface that is movable through the surface zone of the water to accrete oil thereto and convey the accreted oil toward the vessel;
means at the inboard portion of the conveyor system and cooperable with said belt to remove accreted oil therefrom; and
rotatable means mounted adjacent said conveyor system at a location where said belt emerges from said surface zone, said rotatable means carrying outwardly projecting stiff teeth about its periphery, said rotatable means being supported to rotate about an axis extending laterally of and spaced from said belt at a position at which the teeth engage oleaginous material after it has been lifted by the conveyor belt from the surface zone, thereby providing a coaction zone with the conveyor belt to cause adhesion of the oleaginous material thereto for conveyance of the material inboard of the vessel, wherein the conveyor belt is a toothed belt, the teeth thereof being stiff and arranged in longitudinal rows in the direction of conveyor motion, and the teeth of said rotatable means being arranged in spaced rows laterally offset from said longitudinal rows and interleaved therewith at said coaction zone.

11. Scavenging apparatus for removing heavy oil from a surface zone of a body of water comprising:
a support vessel;
an elongate conveyor system extending from a location outside the vessel to a location inboard of the vessel, said conveyor system descending from a location inboard of the vessel to a location outside the vessel and below the water surface, and said conveyor system including an endless belt having stiff teeth projecting therefrom in rows extending longitudinally of the direction of movement of said endless belt;
said conveyor system being movable to transport oil to said inboard location;
rotatable means supported to rotate about an axis extending laterally of and spaced from said endless belt, said rotatable means comprising laterally spaced rows of teeth laterally offset with respect to the rows of teeth projecting from said endless belt;
said rotatable means being supported adjacent said endless belt such that the rows of teeth of said rotatable means interleave with the rows of teeth of said endless belt to form a coaction zone at or adjacent the surface of the water; and
said rotatable means being rotatable to have the teeth thereof move in the same direction as the teeth of said endless belt at the coaction zone to draw oil from said surface zone through the coaction zone for transport along the conveyor system; and
scraper means cooperating with said conveyor system to aid in removing adhering oil therefrom for discharge inboard of said vessel.

12. A scavenging apparatus as claimed in claim 11 in which:
the teeth projecting from said endless belt comprise planar members each of whose planes is parallel to the direction of movement of said endless belt.

13. A scavenging apparatus as claimed in claim 12 in which:
said endless belt comprises a plurality of pivotally-linked transverse slats, each slat having an oleophilic outer surface from which projects a lateral row of said planar tooth members in spaced apart relationship.

14. A scavenging apparatus as claimed in claim 13 in which:
said rotatable means comprises a set of spaced discs rotatable about a common axis and having teeth around the periphery of each disc.

* * * * *